United States Patent
Guzman et al.

(10) Patent No.: US 9,715,872 B2
(45) Date of Patent: Jul. 25, 2017

(54) GRADIENT DENSITY SOUND ATTENUATING COMPOSITE AND PROCESS FOR MAKING

(71) Applicant: CTA Acoustics, Inc., Madison Heights, MI (US)

(72) Inventors: Shawn Jose Guzman, Grosse Pointe, MI (US); Demetrio Bellocido Borja, London, KY (US); Matthew Bargo, II, Corbin, KY (US)

(73) Assignee: CTA Acoustics, Inc., Madison Heights, MI (US)

( * ) Notice: Subject to any disclaimer, the term of this patent is extended or adjusted under 35 U.S.C. 154(b) by 0 days.

(21) Appl. No.: 15/240,510

(22) Filed: Aug. 18, 2016

(65) Prior Publication Data

US 2017/0061948 A1 Mar. 2, 2017

Related U.S. Application Data

(60) Provisional application No. 62/212,576, filed on Aug. 31, 2015.

(51) Int. Cl.
| | |
|---|---|
| *G10K 11/168* | (2006.01) |
| *B32B 21/02* | (2006.01) |
| *B32B 5/16* | (2006.01) |
| *B32B 5/02* | (2006.01) |
| *B32B 3/26* | (2006.01) |

(Continued)

(52) U.S. Cl.
CPC ............ *G10K 11/168* (2013.01); *B32B 3/266* (2013.01); *B32B 5/02* (2013.01); *B32B 5/16* (2013.01); *B32B 23/08* (2013.01); *B32B 23/10* (2013.01); *B32B 27/08* (2013.01); *B32B 27/32* (2013.01); *B32B 27/36* (2013.01); *B32B 2262/0276* (2013.01); *B32B 2262/04* (2013.01); *B32B 2264/0257* (2013.01); *B32B 2307/102* (2013.01); *B60R 13/08* (2013.01)

(58) Field of Classification Search
CPC ........ B32B 21/02; B60R 13/08; G10K 11/168
USPC .................................................. 181/290, 294
See application file for complete search history.

(56) References Cited

U.S. PATENT DOCUMENTS

| | | | | |
|---|---|---|---|---|
| 5,851,626 | A | * 12/1998 | McCorry | ............... B60N 3/048 |
| | | | | 181/288 |
| 6,153,144 | A | 11/2000 | Byma | |

(Continued)

OTHER PUBLICATIONS

Korean Intellectual Property Office, International Search Report and Written Opinion for PCT/US2016/047647 dated Nov. 25, 2016.

*Primary Examiner* — Jeremy Luks
(74) *Attorney, Agent, or Firm* — Middleton Reutlinger (57) ABSTRACT

A sound attenuating material having a homogenous mixture of an organic man-made fiber, an inorganic man-made fiber, a binder, and a cellulose material wherein the organic man-made fiber is polyester, the inorganic man-made fiber is fiberglass, and the binder is a thermosetting resin. A sound attenuating composite is defined by the sound attenuating material and a ground EVA or a mixture of EVA and one or more recycled materials to define a gradient density sound attenuating composite material. Further, the gradient density composite may optionally include a polyfilm upon which the ground EVA or recycled materials may be disposed or two layers of polyfilm to surround the EVA or EVA mixture. The EVA may be pure EVA or may include a mineral fill.

50 Claims, 10 Drawing Sheets

(51) Int. Cl.
  *B32B 23/08* (2006.01)
  *B32B 23/10* (2006.01)
  *B32B 27/08* (2006.01)
  *B32B 27/36* (2006.01)
  *B32B 27/32* (2006.01)
  *B60R 13/08* (2006.01)

(56) References Cited

U.S. PATENT DOCUMENTS

| | | |
|---|---|---|
| 2003/0066708 A1 | 4/2003 | Allison |
| 2004/0023587 A1 | 2/2004 | Bargo |
| 2004/0050619 A1 | 3/2004 | Bargo |
| 2010/0065368 A1* | 3/2010 | Tazian ............... G10K 11/168 181/290 |
| 2014/0265413 A1 | 9/2014 | Demo et al. |

* cited by examiner

GRADIENT DENSITY SOUND ATTENUATING COMPOSITE AND PROCESS FOR MAKING

CROSS-REFERENCE TO PRIOR APPLICATION

This Non-Provisional Patent Application claims priority to and benefit under 35 U.S.C. §119 from Provisional Patent Application having Ser. No. 62/212,576, entitled "Gradient Density Sound Attenuating Material and Process for Making", filed Aug. 31, 2015, all of which is incorporated by reference herein.

BACKGROUND OF THE INVENTION

Field of the Invention

The present embodiments relate to a sound attenuating composite. More specifically, present embodiments relate to a lightweight sound attenuating composite comprising a sound attenuating material and EVA, recycled sound attenuating materials or constituents and/or a combination thereof.

Description of Related Art

Automobile manufacturers typically use sound attenuating materials to line various compartments of an automobile, such as the engine compartment, to inhibit noise from entering a cabin or interior portion of a vehicle. The sound attenuating material may also line the interior of the vehicle, such as the headliner and floorboard, to attenuating sound created from within the cabin.

Automobile manufacturers require the material to meet specific standards. For instance, the sound attenuating material must withstand certain temperatures without burning or melting. It is preferable that the sound attenuating material should not melt or burn, or if the material burns it should have a self-extinguishing characteristic.

Polyester, pure, virgin, or otherwise, is known in the art for use as a sound attenuating material and generally has good sound attenuating characteristics. However, it has been found that polyester does not perform well in the open flame test because the material burns and melts at high temperatures. Additionally, the polyester generally softens and sags at temperatures above 450 degrees Fahrenheit. In an attempt to improve performance of the sound absorbing material in the flame test as well as increase the sound attenuating characteristics, some portion of fiberglass was added to the polyester sound attenuating material. Although fiberglass performed better in the flame test and had good sound attenuation characteristics, it has a major drawback. Fiberglass may cause irritation to human skin, eyes and respiratory systems. Generally, the smaller the fiber sizes the harsher the irritation. Thus, although fiberglass is good in one respect it is not quite as appealing in others.

Another desire of auto-manufacturers and therefore providers is to increase fuel efficiency. This generally means at least attempting to reduce weight of vehicle parts. Still further, the need exists for maintaining or improving sound reduction which decreasing part weight. It is therefore desirable to improve acoustical performance while reducing weight or alternatively improve acoustical performance without increasing weight.

The information included in this Background section of the specification, including any references cited herein and any description or discussion thereof, is included for technical reference purposes only and is not to be regarded subject matter by which the scope of the invention is to be bound.

SUMMARY OF THE INVENTION

It is an object of the present embodiments to provide a product with lower weight and improved acoustic performance.

It is an object of the present embodiments to provide a sound attenuating material which is self-extinguishing.

More particularly, according to some embodiments, a sound attenuating composite material comprises an organic man-made fiber, an inorganic man-made fiber, a thermosetting binder and, pure cellulose fibers. The organic man-made fiber, the inorganic man-made fiber, the binder and the cellulose material defining a homogeneous sound attenuating material. The composite further comprises a granulated EVA, or a mixture of the granulated EVA and one or more of polyester, cellulose, fiberglass, and binder such as for example, phenolic resin, disposed on the homogenous material. One of a face cloth, a foil or both may be disposed adjacent to an EVA or EVA mixture side of the material to enclose the granulated EVA.

The sound attenuating material may be cured in an oven. The material may be fully cured or may be semi-cured.

Optionally, the sound attenuating composite material may further comprise a polyfilm. The sound attenuating composite material the granulated EVA or the mixture of the granulated EVA may be disposed on the polyfilm. The polyfilm may be perforated. The sound attenuating composite material may further comprise a second polyfilm disposed on the granulated EVA.

The organic man-made fiber may be polyester. The polyester fiber may be between about 5 millimeters and 60 millimeters in length. The polyester being virgin polyester or may be reclaimed polyester. The organic man-made fiber may be up to about 70 percent by weight of the sound attenuating material. The organic man-made fiber may be about 19 percent by weight of the sound attenuating material. The polyester may be between about 1.2 and 15 denier.

The inorganic man-made fiber may be fiberglass. The fiberglass may be rotary fiberglass having an average diameter of between about 4 and 8 microns. The fiberglass may be flame attenuated fiberglass having an average diameter of between about 4 and 8 microns. The fiberglass being textile fiberglass. The fiberglass may be up to 50 percent by weight of the sound attenuating material. The fiberglass being about 35 percent by weight of the sound attenuating material. The fiberglass may be between about 12 and 130 millimeters in length and having a diameter of between about 5 microns and 12 microns.

The binder may be between about 10 percent to about 40 percent by weight of said sound attenuating material. The binder may be about 28 percent by weight of the sound attenuating material. The binder may be a thermo-setting resin. The thermo-setting resin may be a phenolic resin. The phenolic resin may be a phenol formaldehyde. The binder may be selected from the group consisted of epoxy resin, vinyl esters, urethane silicones, cross-linkable plastic polymers, cross-linkable rubber polymers.

The cellulose fiber being less than about 50 percent by weight of said sound attenuating material. The cellulose may be pure cellulose, a recycled cellulose or a combination thereof. The cellulose fiber material may be about 19 percent by weight of the sound attenuating material. The cellulose fiber containing about 15 percent by weight of the Kaolin clay. The said cellulose fiber defined by a plurality of strands having an average diameter of about 0.03 millimeters and about 0.08 millimeters in average length.

The sound attenuating composite material may further comprising a polyfilm layer affixed thereto. The polyfilm layer may be being a porous polyolefin layer. The sound attenuating material may further comprise a preselected amount of boric acid.

The sound attenuating composite material may further comprise a face cloth. The face cloth formed of polyester and/or rayon. The face cloth may be formed of about 70 percent polyester and about 30 percent rayon. The ethylene-vinyl acetate (hereinafter "EVA") or mixture of granulated EVA and recycled material may be disposed between a polyfilm and the homogeneous sound attenuating material. The polyfilm may be perforated. The polyfilm may be a thermo-setting plastic. The polyfilm may be formed of one of polypropylene, polyolefin or polyethylene.

The sound attenuating composite material further comprising a second polyfilm on said granulated EVA or said granulated EVA mixture of EVA and recycled particulate. The porous polyfilm may have at least one acoustical flow-through opening sized between about 0.25 percent and 50 percent of the surface area of the polyfilm.

The sound attenuating composite material further comprising a web-adhesive, said web-adhesive being a nonwoven web of thermoplastic adhesive polymer. The web-adhesive being a polyethylene or polyethylene-based material.

The EVA may be pure EVA or EVA and mineral fill. Additionally, the EVA, which may or may not include mineral fill, may be a mixture or blend further comprising recycled materials. In other embodiments, the EVA or mixture of EVA may be replaced with PVC or EPDM, or blends thereof.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE DRAWINGS

In order that the embodiments may be better understood, embodiments of the gradient density sound attenuating material will now be described by way of examples. These embodiments are not to limit the scope of the claims as other embodiments of the lightweight sound attenuating material will become apparent to one having ordinary skill in the art upon reading the instant description. Non-limiting examples of the present embodiments are shown in pictures wherein:

DETAILED DESCRIPTION OF THE PREFERRED EMBODIMENT

It is to be understood that the gradient density sound attenuating material is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-10, a gradient density sound attenuating composite is provided which is lighter in weight than prior art materials but which has equivalent or better performance acoustically. For example, the material may improve total noise reduction coefficient. The embodiments utilize an organic fiber, for non-limiting example polyester, an inorganic fiber for non-limiting example fiberglass, a thermos-setting binder and cellulose. A granulated EVA, which may or may not include a mineral fill, and/or mixture of recycled materials, which may or may not include EVA, may be applied to the material prior to oven curing. Hereinafter, the term EVA is meant to include either of pure EVA or EVA with a mineral fill. The granulated EVA and/or recycled mixture may be applied directly to the uncured mixture defining the sound attenuating mat. Alternatively, the granulated EVA and/or recycled mixture may be applied to a layer of polyfilm. The polyfilm may or may not be porous. Optionally, a second film may be applied over the first and covering the EVA or recycled material. A face cloth, foil or both may also be applied to the material. The material has a lighter weight and lower density. Still further, the material may have self-extinguishing characteristic which is highly desirable.

Figure 1:
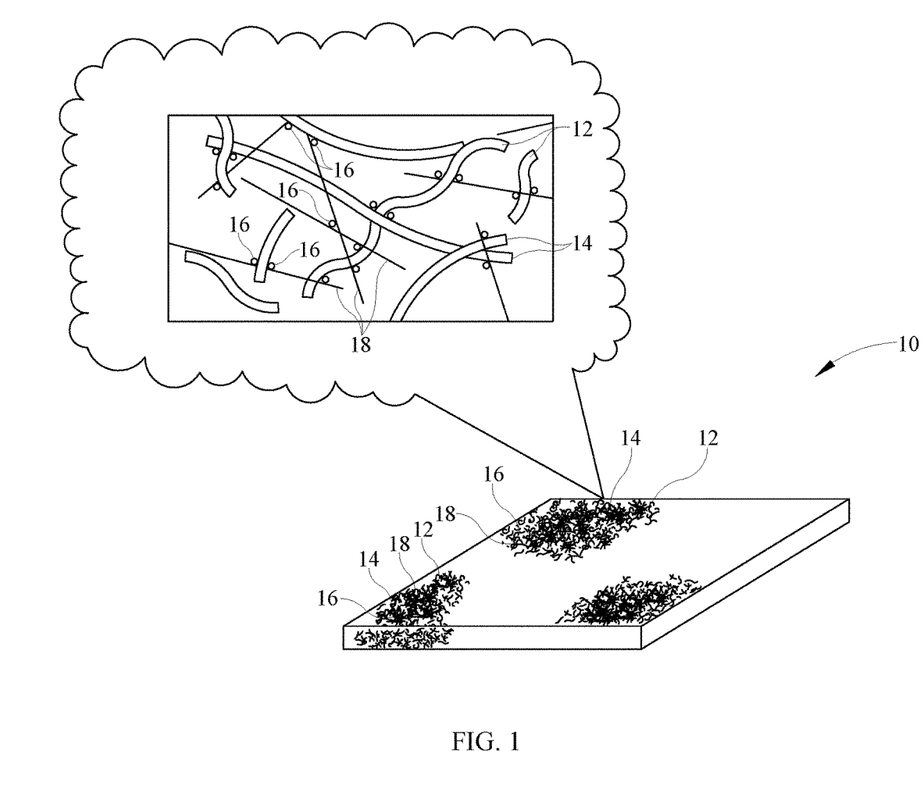
FIG. 1 shows a perspective view of a sound attenuating material of the present invention, including a magnified representation of the homogenous blended matrix of the present invention.

In accordance with the present embodiments, as shown in FIG. 1, a sound attenuating material or mat 10 defining by mat of a homogenous mixture is provided having at least a front and a rear surface in either a cured, uncured, molded or other form. The term "mat" and "sound attenuating composite" are used interchangeably throughout this specification. In addition to automotive uses, the material may be used also for office partitions, ceiling tiles and other acoustical barrier applications. The sound attenuating material 10 has a blended homogeneous matrix of first organic fibers 12 and second inorganic fibers 14. The sound attenuating material 10 may vary in weight and thickness in order to vary the frequency absorption characteristics and may be a preselected size and shape. In one embodiment of the present invention, the sound attenuating material 10 will be from about 2 mm to about 155 mm in thickness with a preselected size and shape. The density of the sound attenuating material 10 may range from about 0.75 to about 40 pounds per cubic foot (lbs./ft$^3$).

The first organic fiber 12 of the blended matrix may be polyester. The polyester fibers 12 may generally have a length of between about 5 millimeters (mm) and about 60 millimeters (mm), and are between about 1.2 to 15 denier in diameter. Further the polyester fibers 12 may comprise up to about 70 percent by weight of the finished product and preferably about 19 percent by weight of the finished sound attenuating material or product. The polyester 12 may be virgin polyester or may be reclaimed from other industrial uses. For instance, if a lot of a polyester product is made which is not up to specification and must be discarded, this polyester product can be processed and used in the instant invention.

In some embodiments, the polyester 12 may be a combination of pure polyester, polyester cellulose, polyester propylene or combinations thereof. Further, polyester or combination may be in the form of virgin or may be recycled polyester material or combinations thereof.

In accordance with the present embodiments, a second inorganic fiber 14 may or may not be included in the blended matrix. The second inorganic fiber 14 may be a fiberglass such as rotary fiberglass, flame attenuated fiberglass, or in accordance with a present embodiment a textile fiberglass. The textile fiberglass 14 may be from about 12 mm to about 130 mm in length and greater than 5 microns in diameter. And, although it is within the scope of this invention to use flame attenuated or rotary fiberglass strands, it is preferable to use textile fiberglass, which is less irritable, more economical, and therefore preferred in a plurality of applications including, for instance the automotive industry. More particularly, the long length of the fiberglass fibers in comparison to rotary or flame attenuated fiberglass results in a sound attenuating material which may be folded without breaking, is less brittle, and is generally more durable. The textile fiberglass 14 of the present invention may comprise up to about 50 percent by weight of the finished product, preferably about 35 percent by weight of the sound attenuating material 10.

The at least polyester fibers 12, and preferably polyester fibers 12 and textile fiberglass fibers 14 of the present invention are further combined with a thermo-setting resin 16. The thermo-setting resin 16 of the instant invention includes phenolic resin, particularly phenol-formaldehyde and more particularly, a powder phenolic resin. The amount of the thermo-setting resin 16 will be from about 10 to 40 percent, preferably about 28 percent by weight of the finished product. However other thermo-setting resins which may be used include, for example, epoxy resins, vinyl esters, urethane silicones, and others. In addition, these resins 16 may be in powder form, latex, oil base, or solvent base form, or they may be liquid polymers.

The blended matrix further comprises fibrous cellulose 18 that is low density but provides increased acoustical performance to the sound attenuating material 10. Since the fibrous cellulose 18 is pulp based, it is low cost compared to other fiber reinforcements. Additionally, the fibrous cellulose 18 may be mixed with Kaolin clay to inhibit moisture absorption. The Kaolin clay may be up to about 15 percent of the cellulose mixture by weight. This is a highly desirable characteristic since moisture absorption may lead to mildew and foul odors within the cabin of an automobile. Preferably, the fibrous cellulose based material 18 has an average diameter of about 0.03 millimeters and average length of about 0.08 millimeters. However, these values may vary if certain characteristics are more desirable than others. In addition, boric acid or some other appropriate compound having both anti-bacterial and anti-fungal growth properties as well as flame retarding properties may be used.

Figure 2:
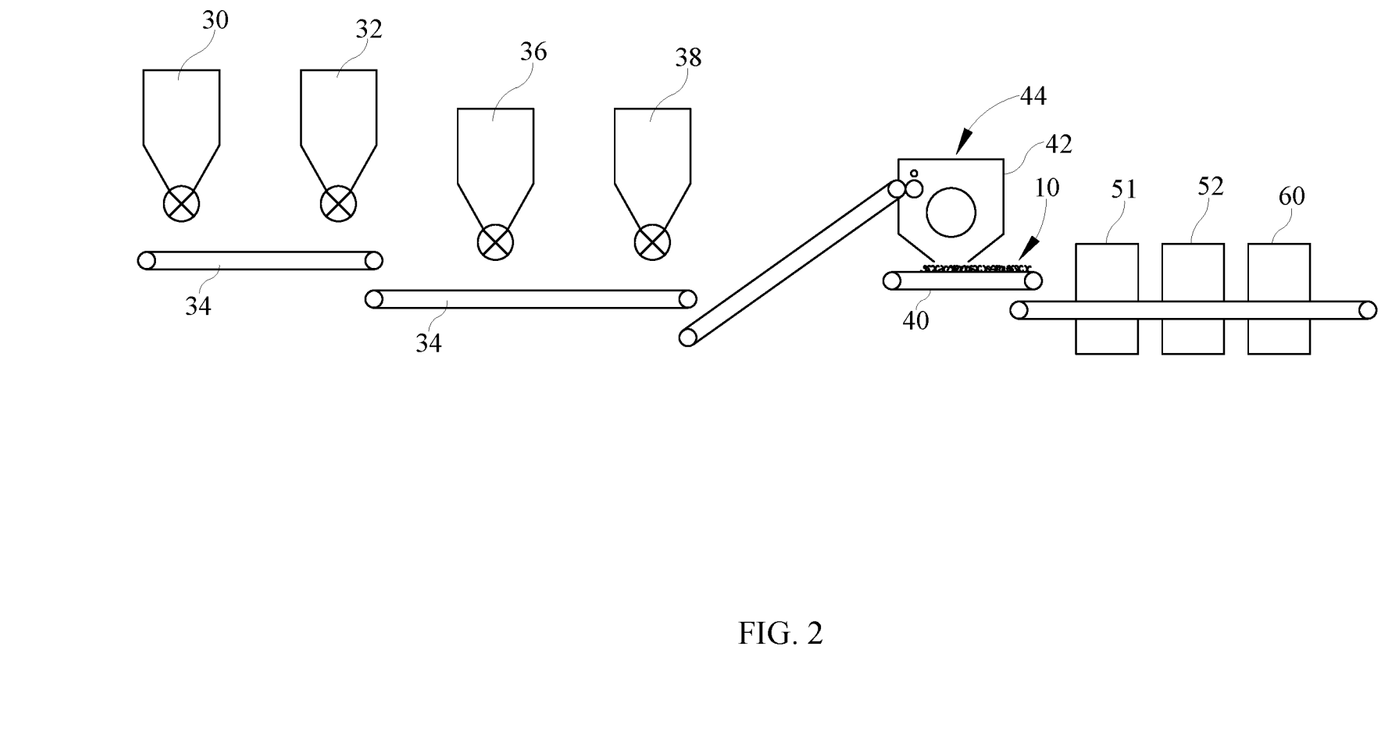
FIG. 2 shows a schematic diagram of a process manufacturing flow sheet of the insulation product of the present invention.

Referring now to FIG. 2, in the manufacture of a product of the present invention, first and second storage bins 30, 32 meter out or feed the polyester 12 (FIG. 1) and textile fiberglass 14 (FIG. 1) respectively onto a first conveyor belt 34 forming an uncured mat thereon. The polyester 12 and fiberglass 14 are fed out at a rate of generally about 250 to 2000 pounds per hour from the storage bins 30, 32. A mixing-picker apparatus 44 may be used to mix and spread or separate the strands of polyester 12 and fiberglass 14. Many devices or apparatuses are known in the art for separating and spreading apart the filaments in a fiber and blending differing fibers such as polyester and fiberglass, producing an evenly distributed mix of ingredients and such a product will not be further discussed herein. However, this step is not essential at this point of the manufacturing process.

Next, third and fourth storage bins 36, 38 feed out thermo-setting resin 16 (FIG. 1) and fibrous cellulose 18 (FIG. 1) onto the mat of polyester 12 and fiberglass 14. The thermo-setting resin 16 may be fed out at a rate from about 65 to about 900 pounds per hour. The cellulose 18 may be fed at a rate of from about 10 to about 1000 pounds per hour. The cellulose 18 may be pure cellulose or recycled material. Further, the cellulose 18 is shown having a distinct bin 38 but in some embodiments, the cellulose 18 may be mixed and fed with other materials such as, for example polyester. Other methods may be used to feed the resin and cellulose. In some exemplary embodiments, one or more materials, including organic fibers and cellulose for non-limiting example, may be pre-mixed and provided by a manufacturer.

Next the fiber-binder-cellulose mixture is conveyed into a mixing-picker apparatus 44 having a forming hood 42 where further mixing occurs. A mixing-picker apparatus 44 is used to mix and spread the strands of polyester 12, fiberglass 14, thermo-setting resin 16, and cellulose 18. The high-speed rotary device facilitates uniform mixing of the sound attenuating material components. For instance, a high-speed cylindrical roller having hardened steel teeth which open the fibers and further mixes the cellulose 18 and resin 16 therewith may be employed. Also, various known means may be used to facilitate mixing and spreading of the first and second man-made fibers 12, 14, cellulose 18 and thermo-setting resin 16 utilized. In the instant process, the mixing device 44 may throw the man-made fibers 12, 14, the thermo-setting resin 16, and the cellulose 18 into the air. A mat 10 forming chain conveyor or area 40 preferably has a suction or negative pressure placed thereon which generally pulls the fibers 12, 14, resin 16 and cellulose 18 against the mat forming conveyor 40 forming a mat of uniform uncured fiber-binder-cellulose. Alternatively, a mat forming area may be understood to include a mat forming roller or other mat forming apparatus. The mat 10 is generally up to about 70 percent by weight polyester, preferably about 19 percent, up to about 50 percent by weight textile fiberglass, preferably about 35 percent, between about 10 to 40 percent co-binder, and may be about 22 percent by thermo-setting resin, and up to about 50 percent by weight cellulose based material, preferably about 19 percent. However, the present invention may also be formed as a mixture of polyester, a cellulose-based material, and a co-binder, without fiberglass.

Figure 5:
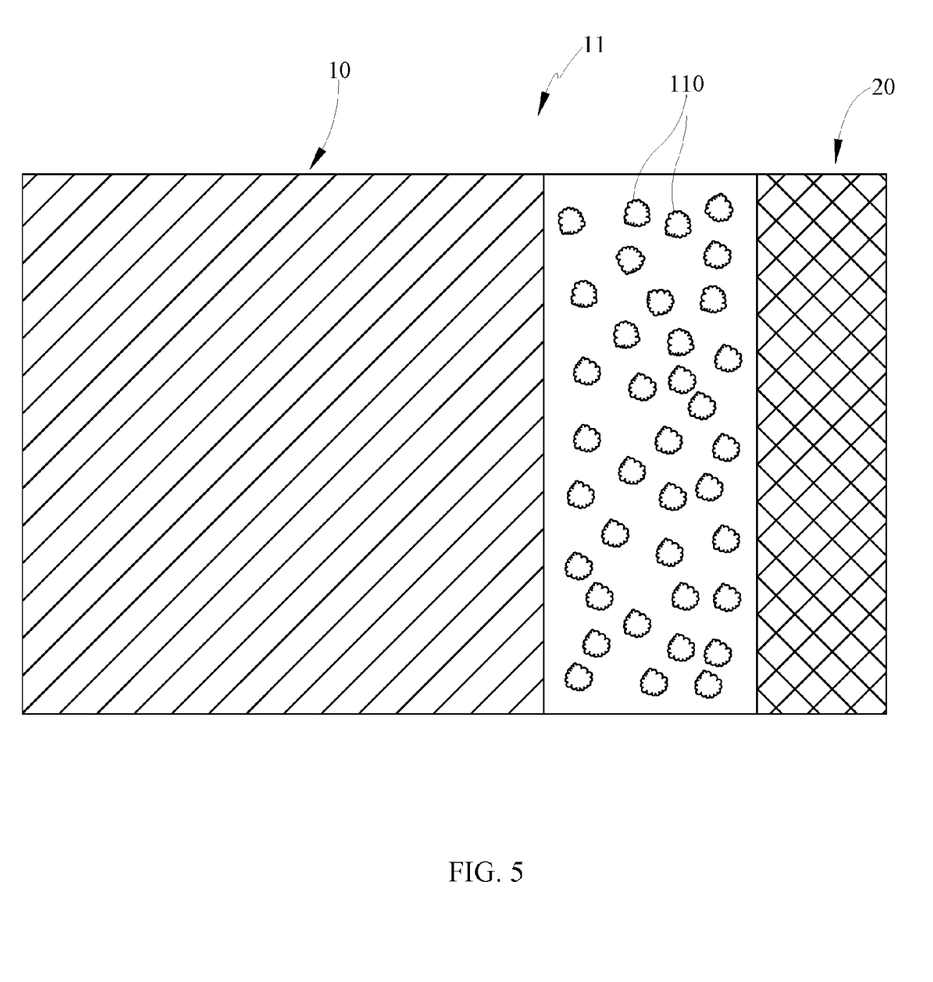
FIG. 5 shows a schematic sectional view of a sound attenuating material having ground EVA.
Figure 9:
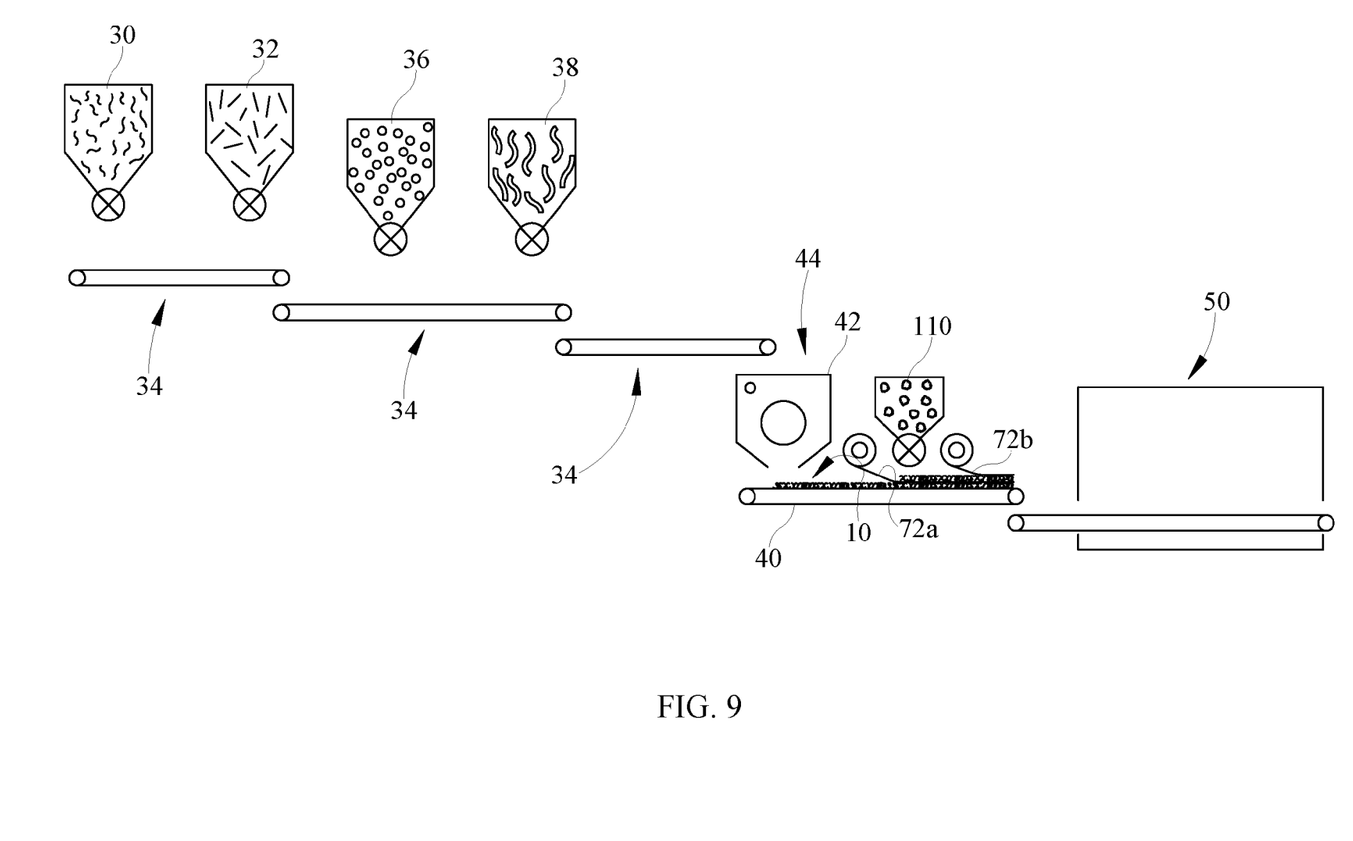
FIG. 9 shows a method of making the sound attenuating material.

After the homogeneous mixture is airlaid, an EVA or EVA and recycled particulate mixture is applied to a surface of the mat 10, for example a top surface in some embodiments to form a composite or composite material 11, as it may be also referred to. The following features are referred by the specific figure number cited in combination with FIG. 9. Referring now to FIGS. 5 and 9, a sectional view of an embodiment is provided including such options. In some embodiments, a granulated ethylene vinyl acetate (EVA) 110 may be added to the mat 10 of homogenous fiber mixture that creates a gradient density product. A gradient density sound attenuating composite material is one that changes its density through a thickness of the composite 11. This variation may be distinct changes in density at each layer or the variation may be of less distinct changes but instead more constant through the thickness of the composite 11 wherein the side with the EVA or EVA and recycled particulate has a higher density than the opposite side of the composite 11. The term composite may include, but is not limited to, a laminate form of the embodiments described. The EVA 110 may be shredded, ground or otherwise applied in small particulate form. The particulate may be of a single shape or vary in shape. The granulated EVA may have a size range of about one quarter of an inch (¼") to about 1 inch (1") and in some embodiments may be about ⅜ inch. Such granulated particulate EVA application may be made in at least two forms. In one embodiment, the EVA 110 may be applied directly to the mat 10 of homogeneous mixture. In such embodiment, the granulated EVA 110, with or without mineral fill, may be dispersed on an outer layer but may or may not disperse into the homogeneous fiber, binder cellulose mixture. This will be dependent on the density of the airlaid mixture and/or the particle size of the EVA 110. For example, the EVA may be up to the 100 percent of the granulate layer or in other embodiments, EVA may be as low as 5% with the remainder the recycled particulate. When discussing a filled EVA, this refers to the mineral filler that is added to pure EVA to extend the use of EVA and/or reduce costs. Common fillers include, but are not limited to, calcium carbonate ($CACO_3$) and Barium Sulfate ($BaSO_4$). As described in some further embodiments, the EVA 110, filled or unfilled, may be mixed with a recycled particulate and dispersed on an outer layer or surface of mat 10.

Further, as shown in this embodiment, the EVA 110 may be covered by a film, web-adhesive, face cloth, foil or combination. This cover is indicated by element 20 in this embodiment to aid in processing.

Figure 6:
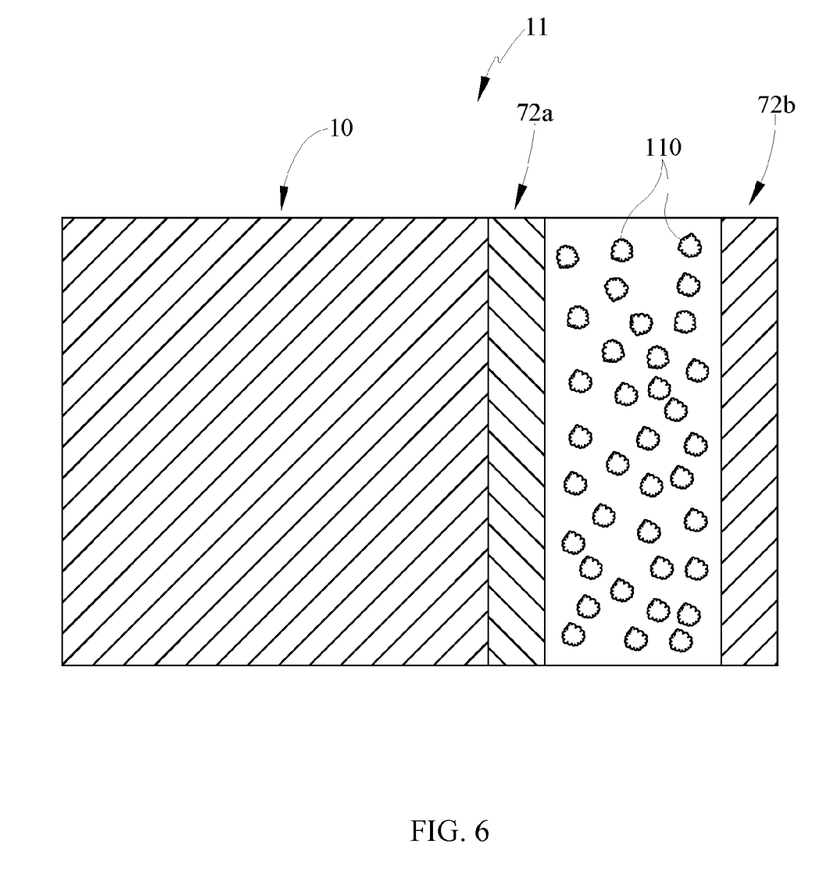
FIG. 6 shows a schematic sectional view of an alternative embodiment of FIG. 5 including an optional polyfilm and a second optional polyfilm.

According to another embodiment of the gradient density sound attenuating composite material 11, and with reference to FIG. 6, the granulated EVA 110 may be applied in combination with one or more layers of polyfilm 72, which may be used alternatively or in addition to the face cloth, foil or combination 20 of FIG. 5. The polyfilm may be one or more layers 72a, 72b, as shown. The polyfilm 72 may be formed of polyethylene, EVA, urethane or other formable film materials, for example polyolefins. Further, the polyfilm 72a may or may not be perforated. Where the polyfilm 72 is utilized and depending on whether or not the polyfilm 72 is perforated or porous, the granulated EVA 110 may be distributed generally in a layer form on the polyfilm 72. In this embodiment, a face cloth, foil or combination 20 (FIG. 5) may also be applied to the second polyfilm 72b, further from the mat 10 of homogeneous mixture or the second film 72b may be substituted with a face cloth or foil or combination 20 (FIG. 5). The second polyfilm 72b may be formed of polyethylene, EVA, urethane or other formable film materials, for example polyolefins. Further, the polyfilm 72b may or may not be perforated. Where the polyfilm 72b is utilized and depending on whether or not the polyfilm 72b is perforated or porous. Further, the polyfilm 72b may be replaced by a web-adhesive. In accordance with some embodiments, the polyfilm 72a may be removed, for example, wherein the EVA 110 may be positioned directly on to the mat 10 and the polyfilm 72b applied to the opposite side of the EVA 110. As described further, this same embodiment or variations thereof may be formed utilizing a mixture 210 (FIG. 7) of EVA and recycled material as well.

The granulated EVA 110, unfilled or mineral filled and/or mixed with recycled material, may be fed out on to the homogeneous mixture 10 or the polyfilm 72 at a rate of between about 36 grams per square foot ($gr./ft^2$) to about 454 grams per square foot ($gr./ft^2$). Of this rate, the EVA, unfilled or filled, may be up to about 60% or as low as 5% with the recycled material making up the remainder. The combination of organic fibers, inorganic fibers and binder defining mat 10, may be laid at a rate of about 40 grams/$ft^2$ to about 180 grams/$ft^2$.

After the mat mixture 10 has the EVA 110 applied, a polyfilm 72 and/or a face cloth, foil or a combination 20 may be applied to the EVA 110. These are generally designated as 20 in the sectional view of FIG. 5.

Figure 7:
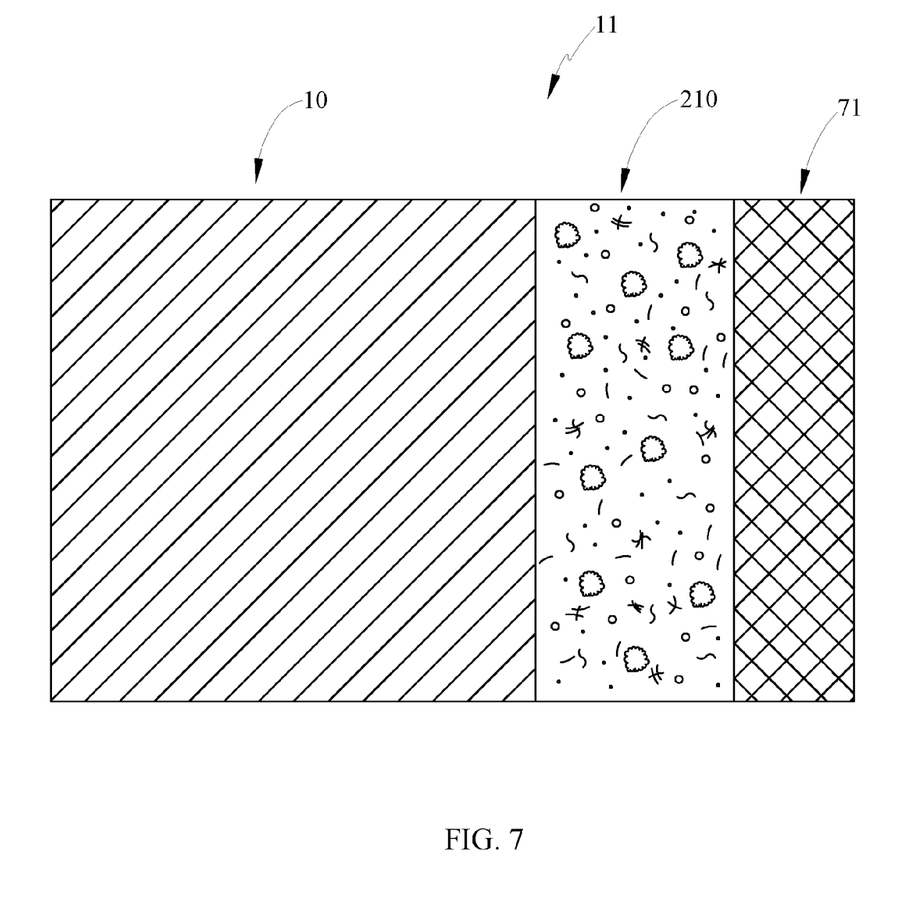
FIG. 7 shows a schematic view of an alternate embodiment including recycled materials.

According to a further embodiment of the gradient density sound attenuating composite material 11, and with reference now to FIG. 7, the granulated EVA may be replaced by a mixture of EVA (unfilled or with mineral fill) and a recycled particulate 210 of one or more materials used for a sound attenuating material. In some embodiments, the EVA and recycled particulate mixture 210 is ground, shredded, granulated or otherwise produced in particle or particulate form. The recycled particulate portion may be formed of organic fibers, inorganic fibers thermosetting binder and/or pure or recycled cellulose. The recycled particulate portion may optionally include some amounts of shredded foil. The recycled particulate may also optionally include one or more of a face cloth, foil or polyfilm generally indicated as element 71. Any of these materials may be used alone or in combination. In the second embodiment, the EVA or EVA with mineral fill may be up to 50% by weight and the recycled particulate 210 may be up to from about 20% to about 80% by weight.

The recycled particulate 210 may be disposed on the mat 10 of homogeneous mixture directly or indirectly. In one embodiment, the recycled material 210 may be disposed directly on the homogeneous mixture 10.

In still further embodiments, with regard to the EVA, with or without mineral fill, or EVA and recycled material mixture, in any of these embodiments, the EVA may be replaced. For example, in some embodiments, the EVA may be replaced with PVC or EPDM. Further, in either of these embodiments, the PVC or EPDM may or may not include mineral fill or may or may not include recycled materials comprising one or more of the components of the composite.

Figure 8:
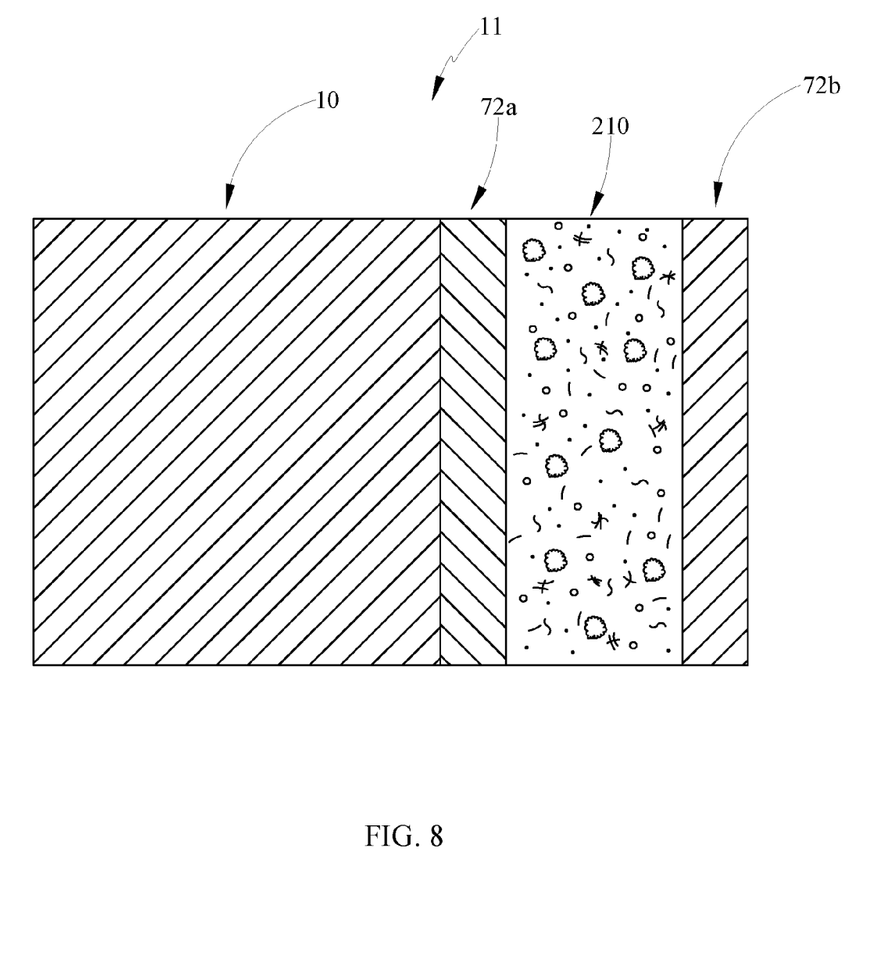
FIG. 8 shows a schematic view of an alternate embodiment of the embodiment shown in FIG. 7.

In another embodiment, and with reference to FIG. 8, the recycled particulate material 210 may be disposed on a layer of polyfilm 72a which is disposed on the homogeneous material 10. In some embodiments, the layer of polyfilm 72a may optionally be porous, perforated or otherwise have holes. In some further embodiments, the sound attenuating material or mat 10 may include a second layer of polyfilm 72b so that there is a first polyfilm layer 72a under and a second polyfilm layer 72b over the recycled material 210. In either of the embodiments of FIGS. 7, 8 a film, face cloth, foil or a combination 20 (FIG. 5) may be applied to the material.

According to instant embodiment, following the preparation of mat 10, the EVA 110 or EVA mixture 210, either of which may or may not include mineral fill, may be added to the mat 10 to define the composite 11. This may occur before the curing process, semi or full curing. Additionally, the polyfilm 72 and/or face, foil or combination 20 are added, the composite 11 may be conveyed to a curing oven 50 (FIG. 9). Within the curing oven 50, the uncured composite 11 is subjected to sufficient heat to at least cure and set a desired proportion of the resin 16. In other words, the mat may be semi-cured or fully cured. In the production of cured composite 11, the oven 50 may have an operating temperature of between about 200 and 500 degrees Fahrenheit. The temperature depends on the thickness and gram weight of the mat being produced and typically the mat remains in an oven between 1 and 4 minutes in order to produce a cured acoustical mat. In the production of a semi-cured composite 11, ready for further molding, the temperature of the oven may range from 200 to 300 degrees Fahrenheit and the curing time may only be about 1 to 3 minutes so that the phenolic resin is only partially set.

Figure 3:
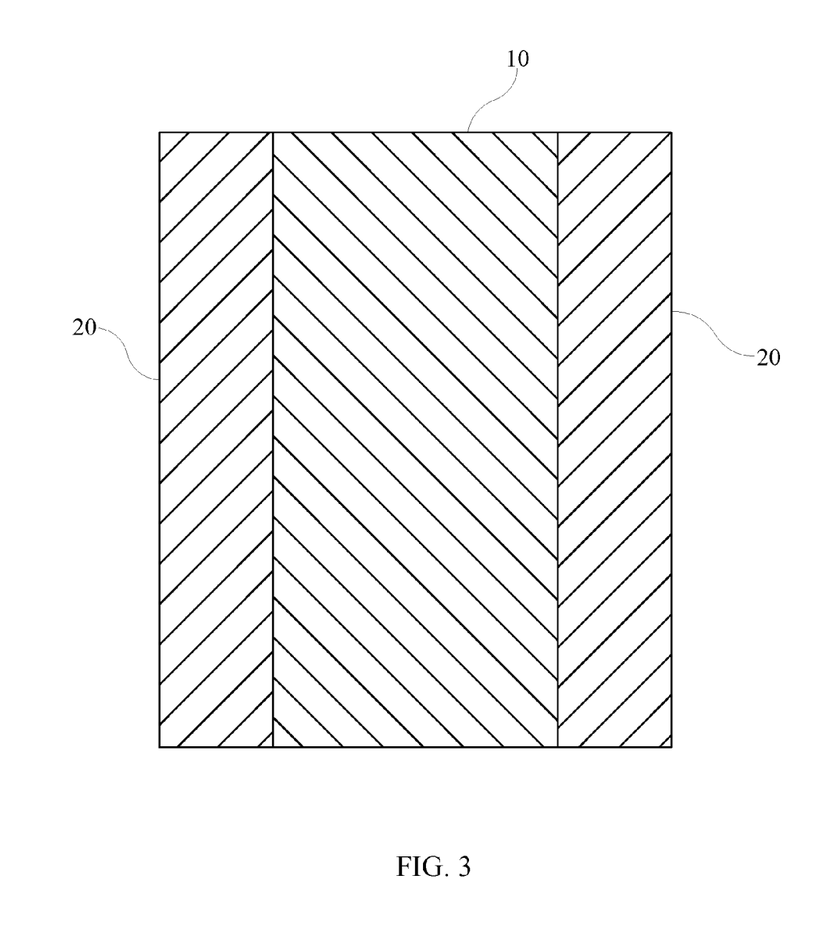
FIG. 3 shows a side sectional view of the sound attenuating material of FIG. 1 having a scrim cover, be it face cloth, foil, or any other laminate material, positioned along outer surfaces thereof.

Referring now to FIG. 3, in accordance with a first alternative, a face cloth, foil or combination 20 may be applied to one or both outer surfaces of the uncured mat or sound attenuating material 10. The face cloth 20 may be comprised of about polyester and rayon, pure polyester, or various other known combinations. A preferred face cloth 20 is about 70 percent polyester and about 30 percent rayon. The face cloth 20 improves aesthetic appearance while providing strength to the sound attenuating material finished product. The face cloth 20 may be applied to the sound attenuating material 10 with a thermoset resin or a thermoplastic and may affect the amount of distortion of a porous polyfilm, described hereinafter, which may also be applied.

In accordance with a second alternative embodiment, a porous polyolefin film 72 may be positioned on the uncured sound attenuating material 10 forming a laminate 70 (FIG. 4) and the composites depicted in FIGS. 6, 8. In a preferred embodiment, the polyfilm 72 is positioned between a sound source and the sound attenuating material 10. The porous polyfilm 72 has at least one acoustical flow-through opening 74, and preferably a plurality of openings 74 comprising between about 0.25 percent and 50.0 percent of the total surface area of the polyfilm 72. The plurality of acoustical flow-through openings 74 may be in a spaced configuration and the initial openings 74, prior to molding, may be a plurality of shapes for example square, circular, or slits. The polyfilm 72 may vary in thickness ranging from about 0.2 mil to about 20 mils and may also vary in weight to absorb and/or attenuate various ranges of frequencies. The porous polyfilm 72 may be between about 0.5 and 40.0 percent by weight of the finished product.

Figure 4:
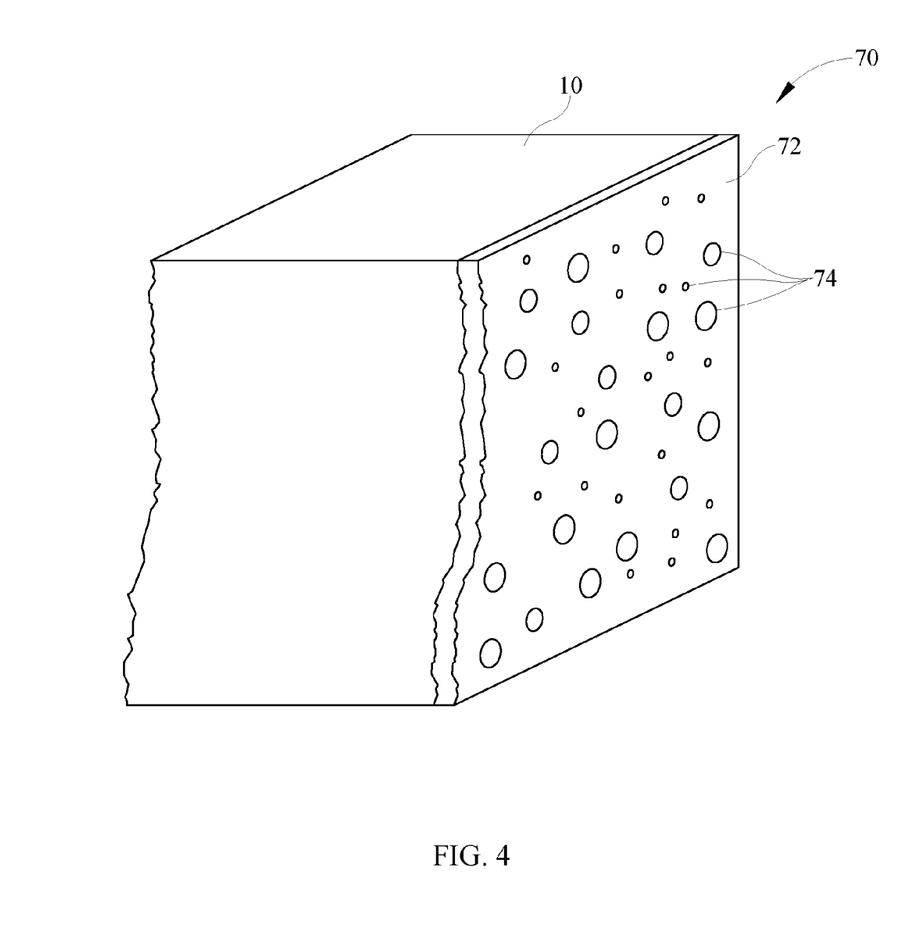
FIG. 4 shows a perspective view of a sound attenuating material having a polyethylene film or other thermoplastic film attached thereto.

In accordance with the second alternative embodiment of the instant invention, the porous polyfilm 72 attenuates or absorbs frequencies below about 2500 Hz better than the sound attenuating material 10 alone and, when used in combination with the sound attenuating material 10, the polyfilm 72 raises the total noise reduction coefficient. The apertures 74 of the porous polyfilm 72 play an important role in attenuating a wide range of low frequencies instead of a very specific limited range. In forming the porous polyfilm 72, a plurality of spaced apertures 74 are placed in the polyolefin film 72. The apertures 74, as discussed above may be from 0.10 to 25.4 square millimeters ($mm^2$) and may be arranged in a spaced configuration. The porous polyfilm 72 is stretched over the sound attenuating material 10 with the application of heat which non-uniformly varies the density of the polyfilm 72 since the polyfilm 72 becomes thinner. In addition, stretching the polyfilm 72 over the sound attenuating material increases the area of the at least one aperture 74, which grows in stress relieving directions.

According to embodiments of the application which may utilize a polyfilm 72, and with reference to FIG. 9, it may be desirable to apply the polyfilm 72 after the mixing picker 44 where the homogeneous uncured mat is airlaid. The polyfilm may be added by use of a roller on to the uncured mat 10 before and/or after the EVA 110 or EVA recycled material mixture 210 is added but before the oven 50. Subsequently, the EVA 110 or EVA mixture 210, or alternatively, the EVA including recycled material may be applied to the polyfilm 72 as depicted. However, in some embodiments, as noted previously, the EVA 110 which may or may not include mineral fill, or the EVA mixture 210 may be laid directly on the sound attenuating material 10. Still further, the polyfilm 72 and/or a web-adhesive 172 (FIG. 10) may be added after the EVA mixture is applied to the sound attenuating material 10 or both before and after the EVA.

In another alternative embodiment of the present invention, it is also desirable to use a face cloth 20. The face cloth 20 helps maintain the laminate 70 of sound attenuating material 10 and the polyfilm 72 once the laminate 70 is manufactured and molded as well as providing an aesthetically pleasing appearance.

Figure 10:
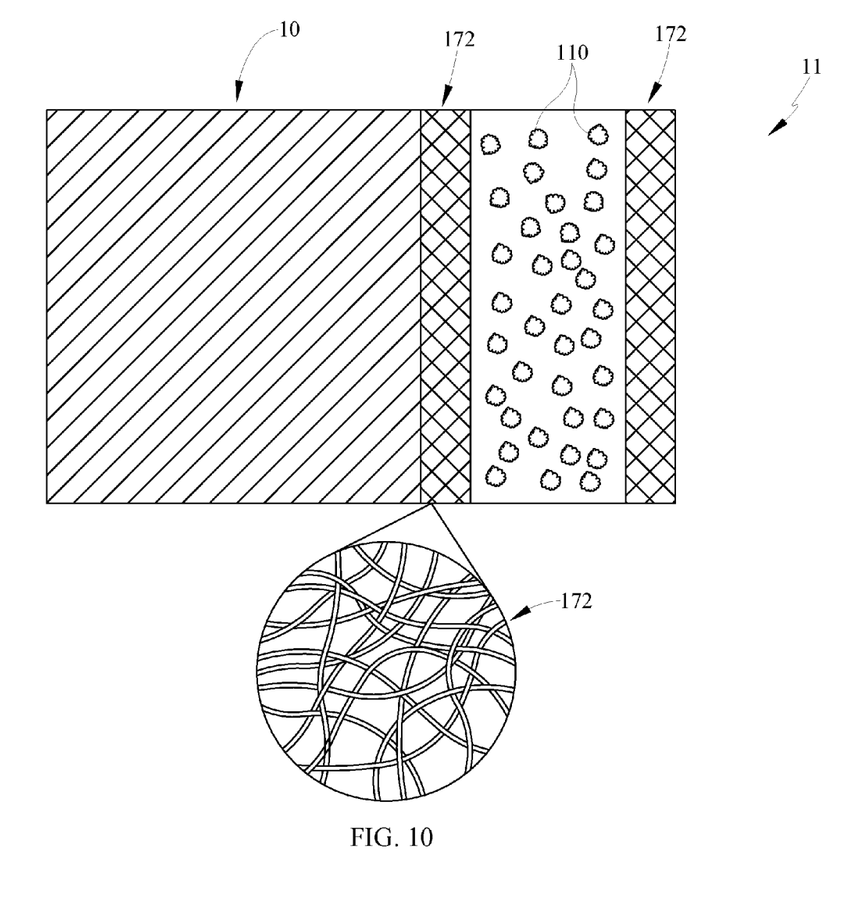
FIG. 10 shows an alternative embodiment wherein a web-adhesive is used.

In the various embodiments described herein, a polyfilm material has been described on one or both sides of the EVA 110 or EVA recycled material mixture 210. As previously noted, the EVA has been described as possibly have some mineral fill therein or being pure EVA. The EVA and recycled material mixture may include EVA and one or more other components of the sound attenuating material or mat 10. In some embodiments, the polyfilm material may be replaced with a web-adhesive 172 (FIG. 10). The web-adhesive may be a thermoplastic adhesive polymer. Further, the web-adhesive may be formed of non-woven fibers. The fibers define a web-like structure that may be used in place of the polyfilm or in some embodiments, may be used in addition to the polyfilm. At least one manufacturer of a web-adhesive may be Spunfab, Ltd. of Cuyahoga Falls, Ohio.

The web-adhesive 172 may be activated with ultrasonic, radio or high frequency, or thermally. Further, pressure may be utilized to also activate the material. The web-adhesive may be rolled and unrolled for laying on the sound attenuating material 10.

Referring again to FIG. 2, the cured or semi-cured composite 11 leaving the curing oven 50 (FIG. 9) may pass through a cooling chamber 51 and then through a slitter 52 where the slitter 52 slits the finished product into sections of a pre-selected width and length. The product is then transferred by conveyor to storage for further use. This may also be applied to the process shown in FIG. 9.

In the molding process, the composite 11, will be completely cured and set into a pre-selected shape and thickness with a molding unit 60. Various types of molds may be used with the instant invention including but not limited to rotary molds, double shuttle molds, non-shuttle molds, and roll-loader molds. These molds are generally driven by hydraulic or air cylinders generating between 1 and 100 pounds per square inch (psi) of molding pressure. Typically, the molding time takes between 45 and 150 seconds with molding temperatures between about 375 degrees and 450 degrees Fahrenheit which is a function of the density and weight of the sound attenuating material 10.

The composite 11 may be formed in either a hot molding or a cold molding process. In a hot molding process heat may be provided to the mold cavity in a plurality of methods including hot forced air provided by gas combustion, electric heat, infrared heating, radiant heating, or heated thermal fluids. The mold temperature should be higher than the desired activation temperature to account for heat loss from the mold and the like. The activation temperature of the thermoset resin may be between about 120 and 500 degrees Fahrenheit. Once the semi-cured sound attenuating material is positioned in the mold cavity, the mold press applies pressure.

In the cold molding process, the sound attenuating material 10 may be produced with a thermoset resin and a thermoplastic, wherein, for instance, the thermoplastic is polyester. The uncured sound attenuating material is heated to an activation temperature of between about 120 and 500 degrees Fahrenheit. Next the laminate elements are placed in a cooled mold which lowers the temperature of the sound attenuating mat to below the activation temperature of the thermoplastic. The mold may be cooled by ambient air, by water, or by a chiller system. Within the cooled mold, pressure is applied in an amount ranging from about 1 to 100 pounds per square inch. After cold molding or hot molding the laminate 10 may be cut to any preselected size and shape. The above described hot and cold molding processes may be repeated for a sound attenuating material formed with a face cloth 20 and a polyfilm 72.

Referring now to FIG. 10, a further embodiment of the gradient density composite 11 is provided. The present embodiment comprises a sound attenuating material 10 which has been previously described and includes the materials set forth in such embodiments. Further, the embodiment of the gradient density composite 11 provides a web-adhesive 172 which is applied to at least one of the sound attenuating material 10 or the EVA 110. The web-adhesive 172 as previously described may be a thermoplastic adhesive polymer. As shown in the detail view, the detail window, the web-adhesive 172 may be formed of non-woven fibers. The fibers define a web-like structure that may be used in place of the polyfilm or in some embodiments, may be used in addition to the polyfilm.

The EVA 110 may be pure EVA, EVA with mineral fill and/or an EVA mixture 210 of either of the preceding and further including a recycled mixture of one or more materials defining the sound attenuating material 10. Thus as stated throughout the specification any reference to EVA may be considered any of these embodiments. Further, the previously noted alternatives to EVA may be utilized.

Further as shown in the embodiment of FIG. 10, the web-adhesive 172 may be disposed on one or both sides of the EVA 110 or EVA mixture 210. Still further, it may be desirable to use the polyfilm 72 and the web-adhesive 172 both.

The web-adhesive 172 may be utilized in the process shown in FIG. 9 by adding a roller with the web-adhesive and incorporating placement of the web-adhesive with roller and a heating process on the mat 10. For example, wherein the polyfilm 72 is added in FIG. 9, the web-adhesive 172 may be added as an alternative or in addition to the polyfilm 72.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A gradient density sound attenuating composite material, comprising:
   an organic man-made fiber;
   an inorganic man-made fiber;
   a thermosetting binder;
   cellulose fibers;
   said organic man-made fiber, said inorganic man-made fiber, said binder and said cellulose fibers defining a homogeneous sound attenuating material;
   a mixture of granulated EVA and recycled particulate, wherein said recycled particulate includes at least one of polyester, cellulose, fiberglass, or thermosetting binder, disposed on said homogenous sound attenuating material; and,
   one of a face cloth, a foil or both disposed on said EVA mixture opposite said homogeneous sound attenuating material.

2. The gradient density sound attenuating composite material of claim 1, wherein said sound attenuating material being cured in an oven.

3. The gradient density sound attenuating composite material of claim 2, wherein said cured being fully cured.

4. The gradient density sound attenuating composite material of claim 2, wherein said cured being semi-cured.

5. The gradient density sound attenuating composite material of claim 1, further comprising a polyfilm.

6. The gradient density sound attenuating composite material of claim 5, wherein said mixture of granulated EVA being disposed on said polyfilm.

7. The gradient density sound attenuating composite material of claim 6, wherein said polyfilm being perforated.

8. The gradient density sound attenuating composite material of claim 5, further comprising a second polyfilm disposed on said granulated EVA mixture.

9. The gradient density sound attenuating composite material of claim 1, wherein said organic man-made fiber being polyester.

10. The gradient density sound attenuating composite material of claim 9, wherein said polyester fiber being between about 5 millimeters and 60 millimeters in length.

11. The gradient density sound attenuating composite material of claim 9, wherein said polyester being virgin polyester.

12. The gradient density sound attenuating composite material of claim 9, wherein said polyester being reclaimed polyester.

13. The gradient density sound attenuating composite material of claim 9, wherein said organic man-made fiber being up to about 70 percent by weight of said sound attenuating material.

14. The gradient density sound attenuating composite material of claim 13, wherein said organic man-made fiber being about 19 percent by weight of said sound attenuating material.

15. The gradient density sound attenuating composite material of claim 9, wherein said polyester being between about 1.2 and 15 denier.

16. The gradient density sound attenuating composite material of claim 1, wherein said inorganic man-made fiber being fiberglass.

17. The gradient density sound attenuating composite material of claim 16, wherein said fiberglass being rotary fiberglass having an average diameter of between about 4 and 8 microns.

18. The gradient density sound attenuating composite material of claim 16, wherein said fiberglass being flame attenuated fiberglass having an average diameter of between about 4 and 8 microns.

19. The gradient density sound attenuating composite material of claim 16, wherein said fiberglass being textile fiberglass.

20. The gradient density sound attenuating composite material of claim 16, wherein said fiberglass being up to 50 percent by weight of said sound attenuating material.

21. The gradient density sound attenuating composite material of claim 20, wherein said fiberglass being about 35 percent by weight of said sound attenuating material.

22. The gradient density sound attenuating composite material of claim 16, wherein said fiberglass being between about 12 and 130 millimeters in length and having a diameter of between about 5 microns and 12 microns.

23. The gradient density sound attenuating composite material of claim 1, wherein said binder being between about 10 percent to about 40 percent by weight of said sound attenuating material.

24. The gradient density sound attenuating composite material of claim 23, wherein said binder being about 28 percent by weight of said sound attenuating material.

25. The gradient density sound attenuating composite material of claim 23, wherein said binder being a thermo-setting resin.

26. The gradient density sound attenuating composite material of claim 25, wherein said thermo-setting resin being a phenolic resin.

27. The gradient density sound attenuating composite material of claim 26, wherein said phenolic resin being phenol formaldehyde.

28. The gradient density sound attenuating composite material of claim 23, wherein said binder selected from the group consisted of epoxy resin, vinyl esters, urethane silicones, cross-linkable plastic polymers, and cross-linkable rubber polymers.

29. The gradient density sound attenuating composite material of claim 1, wherein said cellulose fibers being less than about 50 percent by weight of said sound attenuating material.

30. The gradient density sound attenuating composite material of claim 29, wherein said cellulose fibers being about 19 percent by weight of said sound attenuating material.

31. The gradient density sound attenuating composite material of claim 1, wherein said cellulose fibers containing about 15 percent by weight of Kaolin clay.

32. The gradient density sound attenuating composite material of claim 29, wherein said cellulose fibers defined by a plurality of strands having an average diameter of about 0.03 millimeters and about 0.08 millimeters in average length.

33. The gradient density sound attenuating composite material of claim 1, further comprising a polyfilm layer affixed thereto.

34. The gradient density sound attenuating composite material of claim 33, wherein said polyfilm layer being a porous polyolefin layer.

35. The gradient density sound attenuating composite material of claim 1, further comprising a preselected amount of boric acid.

36. The gradient density sound attenuating composite material of claim 1, wherein said face cloth formed of rayon.

37. The gradient density sound attenuating composite material of claim 36, wherein said face cloth formed of polyester.

38. The gradient density sound attenuating composite material of claim 36, wherein said face cloth formed of about 70 percent polyester and about 30 percent rayon.

39. The gradient density sound attenuating composite material of claim 1, wherein said mixture of granulated EVA and recycled particulate disposed on said homogeneous sound attenuating material, a polyfilm disposed between said mixture of granulated EVA and recycled particulate and said face cloth, said foil or both.

40. The gradient density sound attenuating composite material of claim 5, wherein said polyfilm being perforated.

41. The gradient density sound attenuating composite material of claim 5, wherein said polyfilm being a thermo-setting plastic.

42. The gradient density sound attenuating composite material of claim 5, wherein said polyfilm being formed of polypropylene.

43. The gradient density sound attenuating composite material of claim 5, wherein said polyfilm being formed of polyethylene.

44. The gradient density sound attenuating composite material of claim 5, further comprising a second polyfilm on said mixture of granulated EVA and recycled particulate.

45. The gradient density sound attenuating composite material of claim 41, wherein said porous polyfilm having at least one acoustical flow-through opening sized between about 0.25 percent and 50 percent of the surface area of the polyfilm.

46. The gradient density sound attenuating composite material of claim 1, further comprising a web-adhesive.

47. The gradient density sound attenuating composite material of claim 46, wherein said web-adhesive being a non-woven web of thermoplastic adhesive polymer.

48. The gradient density sound attenuating composite material of claim 47, wherein said web-adhesive being a polyethylene or polyethylene-based material.

49. The gradient density sound attenuating composite material of claim 1, wherein said granulated EVA of said mixture further comprises a mineral fill.

50. A gradient density sound attenuating composite material, comprising:
    an organic man-made fiber;
    an inorganic man-made fiber;
    a thermosetting binder;
    cellulose fibers;
    said organic man-made fiber, said inorganic man-made fiber, said binder and said cellulose fibers defining a homogeneous sound attenuating material;
    a mixture of granulated PVC and recycled particulate, wherein said recycled particulate includes at least one of polyester, cellulose, fiberglass, or thermosetting binder, disposed on said homogenous material; and,
    one of a face cloth, a foil or both disposed on said PVC mixture opposite said homogeneous sound attenuating material.

* * * * *